US009442203B2

(12) United States Patent
Fushimi

(10) Patent No.: US 9,442,203 B2
(45) Date of Patent: Sep. 13, 2016

(54) NEUTRON MONITORING SYSTEM

(71) Applicant: Hitachi-GE Nuclear Energy, Ltd., Hitachi-shi, Ibaraki (JP)

(72) Inventor: Atsushi Fushimi, Tokyo (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 480 days.

(21) Appl. No.: 14/299,868

(22) Filed: Jun. 9, 2014

(65) Prior Publication Data

US 2014/0362966 A1   Dec. 11, 2014

(30) Foreign Application Priority Data

Jun. 10, 2013   (JP) .................................. 2013-121463

(51) Int. Cl.
*G21C 17/108*   (2006.01)
*G01T 3/00*   (2006.01)
*G21C 17/10*   (2006.01)

(52) U.S. Cl.
CPC ............... *G01T 3/006* (2013.01); *G21C 17/10* (2013.01); *G21C 17/108* (2013.01)

(58) Field of Classification Search
CPC .... G21C 17/10; G21C 17/108; G01T 3/006; G01T 3/00
USPC ........................................ 376/254, 258, 259
See application file for complete search history.

(56) References Cited

U.S. PATENT DOCUMENTS

| | | | | |
|---|---|---|---|---|
| 3,238,370 A * | 3/1966 | Leeds | .................... | G21C 17/10 376/254 |
| 5,490,184 A * | 2/1996 | Heibel | .................... | G21C 17/00 376/254 |
| 2010/0220831 A1* | 9/2010 | Sato | ........................ | G21C 17/10 376/254 |
| 2013/0177122 A1* | 7/2013 | Fushimi | ............... | G21C 17/035 376/247 |
| 2014/0318237 A1* | 10/2014 | Kenjyo | ................ | G21C 17/035 73/292 |

FOREIGN PATENT DOCUMENTS

JP   59-112290 A   6/1984

\* cited by examiner

*Primary Examiner* — Jack W Keith
*Assistant Examiner* — Daniel Wasil
(74) *Attorney, Agent, or Firm* — Crowell & Moring LLP

(57) ABSTRACT

A neutron monitoring system for a nuclear reactor can correct measured neutron flux by taking into consideration neutron moderation based on whether a neutron detector is fully immersed in coolant water or exposed above the water level. The neutron detector and a water detection sensor are mounted at the same height in the nuclear reactor. The water detection sensor includes a thermocouple and a heating element positioned to heat the thermocouple. A temperature measuring component is connected to the thermocouple. A water existence determining component can determine, based on temperature measured by the temperature measuring component, whether the water detection sensor (and thus the neutron detector) is underwater. A correction component can correct a neutron detection signal from the neutron detector in accordance with whether the neutron detector is below or above the water level.

5 Claims, 6 Drawing Sheets

NEUTRON MONITORING SYSTEM

BACKGROUND OF THE INVENTION

1. Field of the Invention

The present invention relates generally to neutron monitoring systems, and more particularly, to a neutron monitoring system that measures a neutron flux using neutron detectors placed inside a nuclear reactor or under the reactor vessel.

2. Description of the Related Art

Generally, neutron detectors are placed inside a nuclear reactor to monitor nuclear power of the reactor. For example, a boiling-water reactor includes an in-core instrumentation tube inserted in a gap of the fuel assemblies installed in a grid-like form inside the reactor. Inside the in-core instrumentation tube placed are neutron detectors such as fission chambers for monitoring of nuclear power. Upon entry of a neutron, the neutron detectors generate an electric signal and send a measured neutron flux signal to a power monitoring device installed outside the reactor pressure vessel, through independent cables connected to the detectors. The neutron detectors here detect the neutrons generated from the core fuel immersed in coolant water.

A water level gauge for measuring the coolant water level in the reactor is provided to confirm whether appropriate cooling is performed on the core fuel. An instrument with a differential pressure gauge is commonly used as the water level gauge. Further, a method of detecting the reactor coolant water level directly inside the reactor has come to be considered to ensure diversity of detection methods.

For example, Japanese Patent Application No. JP-1984-112290-A discloses a reactor core monitoring device that senses a coolant water level with a plurality of sheathed thermocouples placed in an in-core instrumentation tube of a boiling-water reactor. The sheathed thermocouples are placed at different heights from a lower section of the reactor, and differential output between upper and lower sheathed thermocouples are detected, thereby sensing the coolant water level.

SUMMARY OF THE INVENTION

Analysis of a signal which a neutron detector has detected is effective for confirming core/fuel state associated with an accident, as well as for monitoring output power of the core during normal operation. The analysis is particularly crucial for obtaining information on the power and position of the core/fuel suffering a change in shape due to a severe accident such as meltdown of the fuel.

For this reason, it is conceivable that in case of a core melting accident, for example, the fuel would be monitored using neutron detectors placed in the core positioned inside the reactor pressure vessel, and neutron detectors placed outside the reactor pressure vessel, in addition to neutron detectors used for monitoring during normal operation. In this case, it is necessary, from a viewpoint of neutron detector sensitivity, to detect whether the neutron detectors are immersed in coolant water or exposed above the water level. If the neutron detectors are immersed in the coolant water, a nuclear reaction during which the neutrons are sensed will be accelerated since neutrons are moderated in the water. Consequently, the neutron detector sensitivity will be increased.

Under such a severe accident state that causes the melting of the core, however, it is very difficult to judge whether the neutron detectors are fully immersed in the coolant water or exposed.

The present invention has been made on the basis of the above, and an object of the invention is to provide a neutron monitoring system that reliably senses whether neutron detectors are fully immersed in coolant water or exposed above the water level, and thus accurately monitors neutrons.

The present invention includes a plurality of means to attain the above object. To cite an example, a neutron monitoring system for monitoring a state of a fuel used in a nuclear power plant includes the following: neutron detector; a structural material to which the neutron detector is mounted; a water detection sensor mounted at a position corresponding to the same height as is the neutron detector, the water detection sensor including a thermocouple and a heating element; an amplification circuit configured to amplify a neutron monitoring signal sent from the neutron detector; a temperature measuring circuit connected to a thermocouple of the water detection sensor via strands; a heater power supply connected to a heating element of the water detection sensor via heater lead wires; a water existence determining control section configured to determine whether the water detection sensor is underwater; and a correction circuit configured to correct an output signal value of the amplification circuit in accordance with a determination signal from the water existence determining control section.

In the present embodiment, whether the each neutron detector is fully immersed in coolant water or exposed above the water level can be sensed, and the sensed result can correct the measured data by the neutron detectors. This in turn enables accurate detection of neutrons, thus contributing to estimating power and a fuel position more accurately even in case of such a severe accident that causes the fuel to melt.

DESCRIPTION OF THE PREFERRED EMBODIMENTS

Hereunder, an embodiment of a neutron monitoring system of the present invention will be described using the accompanying drawings.

Figure 1:
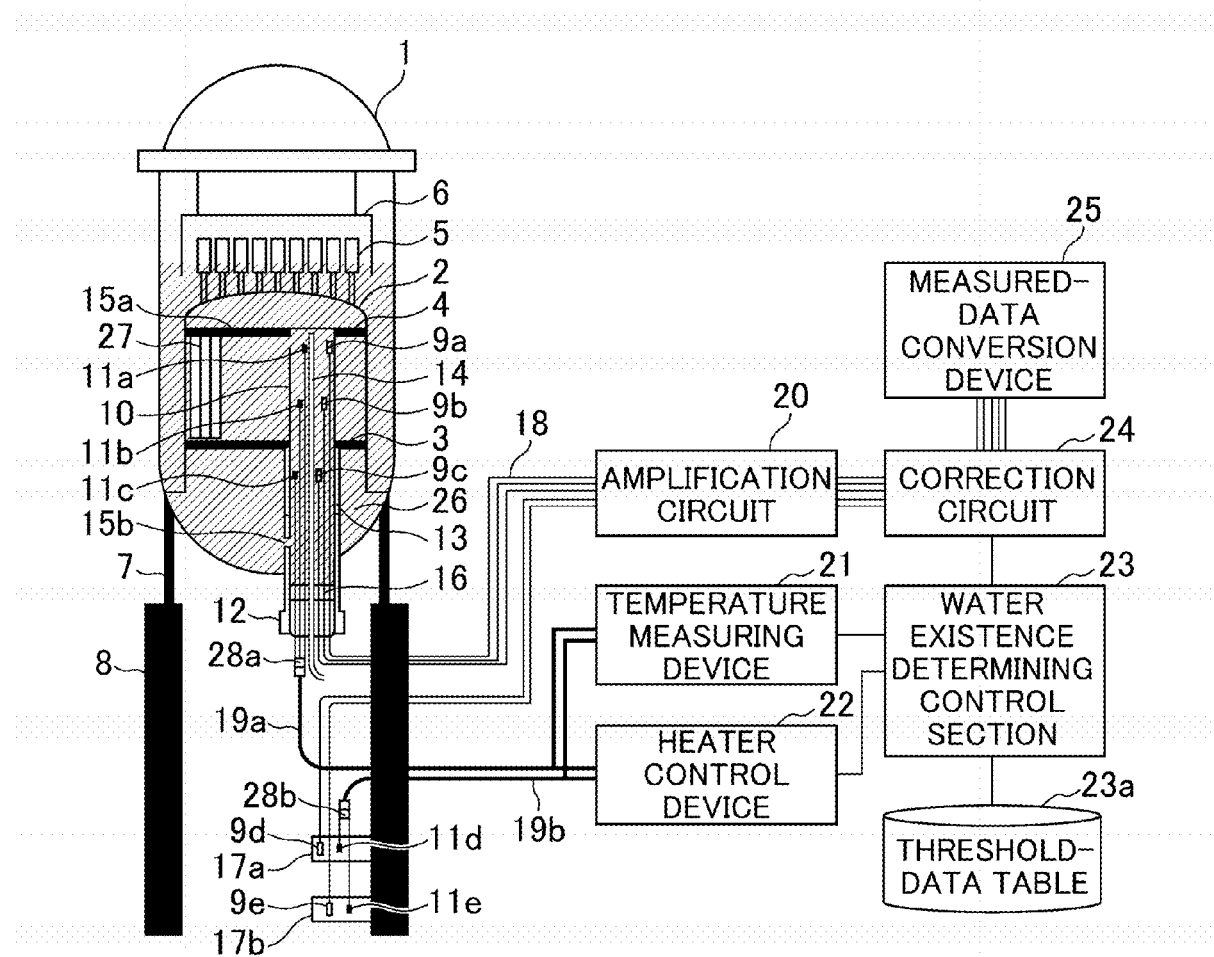
FIG. 1 is a system block diagram showing an embodiment of a neutron monitoring system of the present invention.

FIG. 1 is a system block diagram showing the embodiment of the neutron monitoring system of the present invention.

Referring to FIG. 1, a reactor pressure vessel 1 contains a shroud 2. A fuel 27 is retained between a core support plate 3 and a core top guide 4, inside the shroud 2. A steam separator 5 and a steam dryer 6 are placed near an upper section of the shroud 2. The steam separator 5 and the steam dryer 6 work together to separate core-generated steam from coolant water 26 and then supply the separated steam to a turbine not shown. The reactor pressure vessel 1 is fixed to a pedestal 8 via a support skirt 7.

An in-core instrumentation tube 10 is disposed in a gap of a large number of fuel assemblies 27 arrayed in a grid-like form, has a lower section inserted in an in-core instrumentation housing 12 and an in-core instrumentation guide tube 13, and is fixed at an upper end of the tube 10 to the core top guide 4.

Neutron detectors 9a to 9c are housed in the in-core instrumentation tube 10. Some of the detectors are placed inside the core, and some of them are placed under the core, inside the pressure vessel. Water detection sensors 11a to 11c are mounted at positions corresponding to the same heights as are the corresponding neutron detectors 9a-9c inside the in-core instrumentation tube 10 (e.g., the water detection sensor 11a is mounted at a position corresponding to the same height as is the neutron detector 9a).

In addition to the neutron detectors 9a-9c and the water detection sensors 11a-11c, a guide tube of the traversing in-core probe 14 is stored within the in-core instrumentation tube 10. An upper water hole 15a for cooling is provided at an upper side of the in-core instrumentation tube 10, a lower water hole 15b is provided at a lower side of the in-core instrumentation tube 10, and a seal 16 is disposed at an even lower portion relative to the water hole 15b. This core construction allows the coolant water to flow through the in-core instrumentation tube 10 and not to leak from the core.

A first support structural material 17a and a second support structural material 17b are each connected at one end thereof to the pedestal 8. On the first support structural material 17a, a neutron detector 9d and a water detection sensor 11d are placed at positions of the same height from a bottom section of the pedestal 8. On the second support structural material 17b, a neutron detector 9e and a water detection sensor 11e are likewise placed at other positions of the same height from the bottom section of the pedestal 8. In the present embodiment, the second support structural material 17b is mounted at a position corresponding to substantially the same height of the bottom of the pedestal 8, and the first support structural material 17a is mounted at a position higher than that of the second support structural material.

The neutron detectors 9a-9e are each connected to an amplification circuit 20 through a neutron detector cable 18.

In addition, the water detection sensors 11a-11c are each connected to a temperature measuring device 21 and a heater control device 22 via a water detection sensor cable 19a and a connector 28a. Similarly, the water detection sensors 11d-11e are each connected to a temperature measuring device 21 and a heater control device 22 via a water detection sensor cable 19b and a connector 28b.

The temperature measuring device 21 and the heater control device 22 are connected to a water existence determining control device 23. The water existence determining control device 23 includes a storage device 23a within which a threshold data table is stored, and outputs a water existence determination signal to a correction circuit 24. An output signal from the amplification circuit 20 is corrected in the correction circuit 24 and reaches a measured-data conversion device 25.

Figure 2:
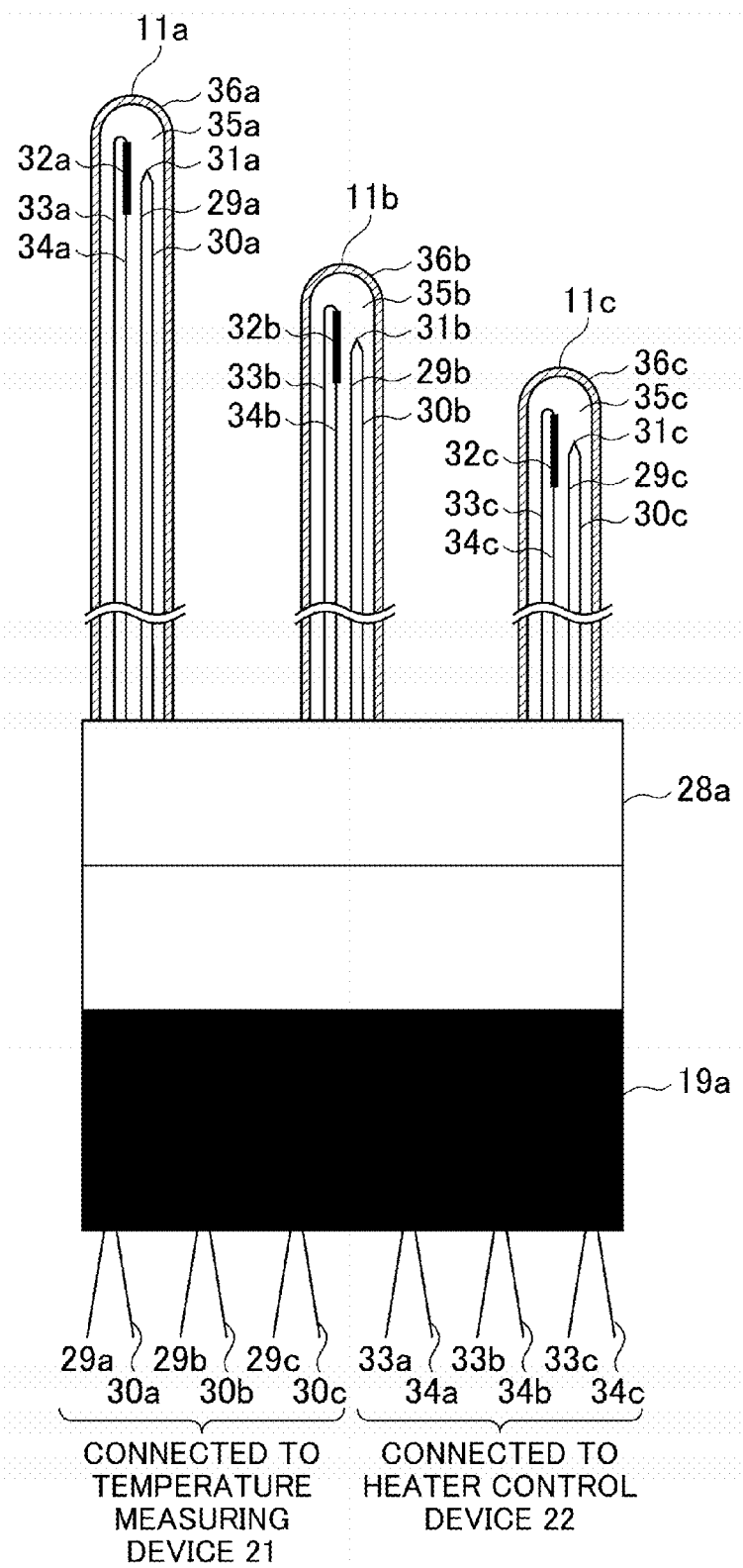
FIG. 2 is a conceptual diagram showing an example of water detection sensors which constitute part of the embodiment of the neutron monitoring system according to the present invention.

Next, the water detection sensors are described below using the accompanying drawings. FIG. 2 is a conceptual diagram showing an example of water detection sensors which constitute part of the embodiment of the neutron monitoring system according to the present invention. In FIG. 2, the same reference numbers as those shown in FIG. 1 denote the same elements, detailed description of which is omitted hereinafter.

FIG. 2 shows construction of three water detection sensors, 11a-11c. These sensors are substantially of the same construction, so only the water detection sensor 11a is described below.

The water detection sensor 11a contains a thermocouple 31a, a heating element 32a, and heater lead wires 33a, 34a. The thermocouple 31a uses a plus-side strand 29a and a minus-side strand 30a bonded together. The heating element 32a heats a neighborhood of the thermocouple 31a.

The thermocouple 31a can be a commonly used K-type or N-type of thermocouple. A high-resistance wire of a nickel-chromium alloy, for example, is preferred as the heating element 32a. Use of copper wires, nickel wires, or other wires of relatively low resistance, as the heater lead wires 33a, 34a, allows suppression of a voltage necessary for a heater power supply.

The thermocouple 31a and the heating element 32a are electrically insulated from each other via an insulating material 35a such as alumina, and housed in a sheath 36a made of stainless steel, for example. The plus-side strand 29a, the minus-side strand 30a, and the heater lead wires 33a, 34a are connected to respective conductors of the water detection sensor cable 19a via the connector 28a. Through these conductors, the plus-side strand 29a and the minus-side strand 30a are connected to the temperature measuring device 21, and the heater lead wires 33a, 34a are connected to the heater control device 22. While the water detection sensors 11a-11c are shown by way of example in FIG. 2, substantially the same construction is also applied to the water detection sensors 11d and 11e.

Figure 3:
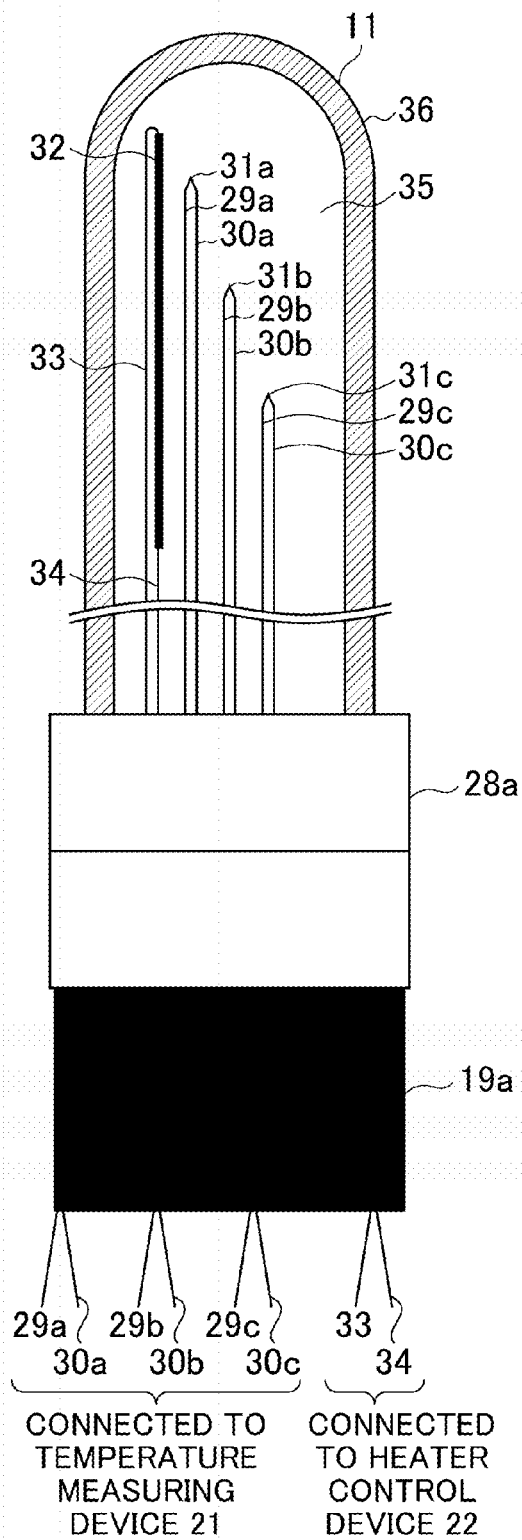
FIG. 3 is a conceptual diagram showing another example of water detection sensors which constitute part of the embodiment of the neutron monitoring system according to the present invention.

Next, another example of water detection sensors is described below using FIG. 3. FIG. 3 is a conceptual diagram showing another example of water detection sensors which constitute part of the embodiment of the neutron monitoring system according to the present invention. In FIG. 3, the same reference numbers as those shown in FIGS. 1 and 2 denote the same elements, detailed description of which is omitted hereinafter.

In each of the water detection sensors 11a-11c shown in FIG. 3, three thermocouples, 31a to 31c, are arranged at positions of different heights inside a sheath 36 made of stainless steel, for example. One heating element 32 is housed to heat in common a neighborhood of the thermocouples 31a-31c. The heating element 32 and heater lead wires 33, 34 have substantially the same construction as that of the heating element 32a and heater lead wires 33a, 34a described above. Plus-side strand 29a-29c and minus-side strands 30a-30c, which constitute part of each of the thermocouples 31a-31c, are each connected to the temperature measuring device 21 via a connector 28a and conductors of a water detection sensor cable 19a. The heater lead wires 33, 34 are each connected to the heater control device 22. While the water detection sensors 11a-11c are shown by way of example in FIG. 3, substantially the same construction is also applied to water detection sensors 11d and 11e.

Figure 4:
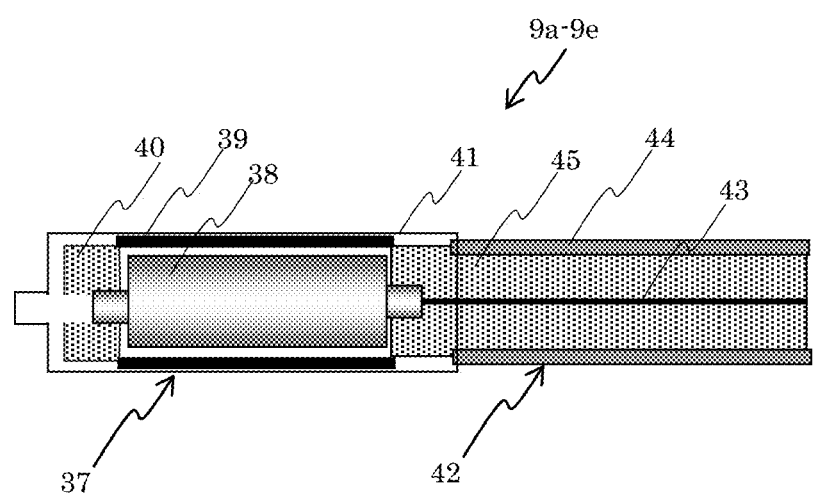
FIG. 4 is a partial, longitudinal cutaway view showing a fission chamber used as a neutron detector to constitute another part of the embodiment of the neutron monitoring system according to the present invention.

Next, a neutron detector is described below using the accompanying drawings. FIG. 4 is a partial, longitudinal cutaway view showing a fission chamber used as a neutron detector to constitute another part of the embodiment of the neutron monitoring system according to the present invention. In FIG. 4, the same reference numbers as those shown in FIGS. 1 to 3 denote the same elements, detailed description of which is omitted hereinafter.

FIG. 4 shows a structural example of a fission chamber 37 used as a neutron detector 9a-9e. The fission chamber 37 includes a metallic anode 38, which is a positive electrode, and a metallic cathode 39, which is a negative electrode. The cathode 39 is coated with a fission material such as U-235. The anode 38 and the cathode 39 are insulated from each other via an insulating body 40, and are supported to maintain a fixed clearance between the electrodes. The clearance between the anode 38 and the cathode 39 is filled in with an inert gas such as argon. In addition, the cathode 39 has its outer region shrouded with a casing 41 electrically connecting to the cathode 39.

Connected to the fission chamber 37 is a mineral-insulated cable 42 which can withstand an internal environment of the reactor. The mineral-insulated cable 42 includes a conductor 43 formed from copper or stainless steel, a metal sheath 44 covering the conductor 43, and a mineral insulator 45 such as alumina or magnesia. The mineral insulator 45 is disposed between the conductor 43 and the metal sheath 44 to electrically insulate them from each other. The conductor 43 is electrically connected to the anode 38, and the metal sheath 44 to the housing 41.

In the fission chamber 37, a voltage from about several tens of volts to a high voltage of nearly thousand volts is applied between the anode 38 and the cathode 39 to generate electric fields. Upon entry of a neutron into the fission chamber 37 under this state, part of the fission material within the cathode 39 undergoes fission, with a resulting fission product ionizing the inert gas and causing a current between the anode 38 and the cathode 39. Additionally, a current is detected to measure a neutron flux (intensity of radiation).

Figure 5:
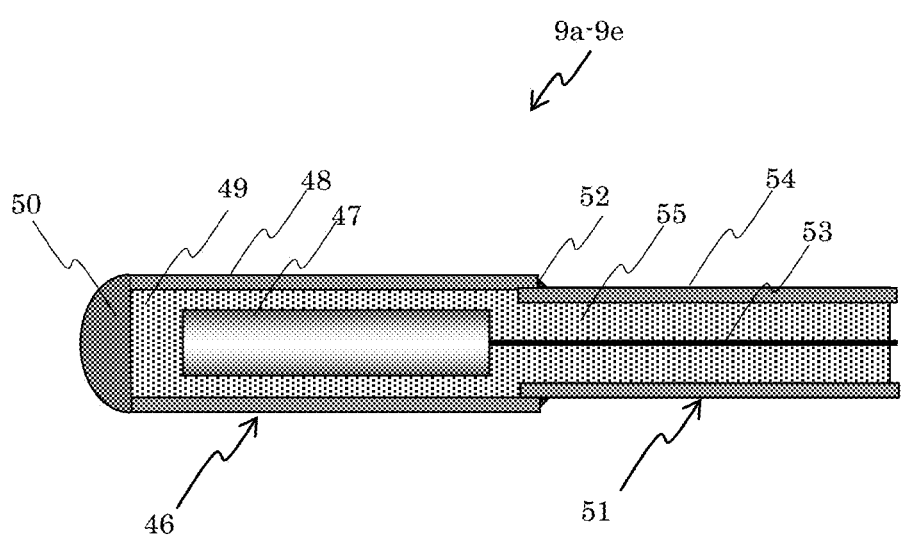
FIG. 5 is a partial, longitudinal cutaway view showing a self-powered neutron detector used as a neutron detector to constitute yet another part of the embodiment of the neutron monitoring system according to the present invention.

Next, another example of a neutron detector is described below using FIG. 5. FIG. 5 is a partial, longitudinal cutaway view showing a self-powered neutron detector used as a neutron detector to constitute yet another part of the embodiment of the neutron monitoring system according to the present invention. In FIG. 5, the same reference numbers as those shown in FIGS. 1 to 4 denote the same elements, detailed description of which is omitted hereinafter.

FIG. 5 shows a structural example of a self-powered neutron detector 46 used as a neutron detector 9a-9e to constitute yet another part of the embodiment of the neutron monitoring system according to the present invention.

The self-powered neutron detector 46 includes an emitter 47 and a collector 48. The self-powered neutron detector 46 is constructed so that entry of a neutron into the emitter 48 causes a current between the emitter 47 and the collector 48. The collector 48 covers the emitter 47, and a mineral insulator 49 such as alumina is filled between the collector 48 and the emitter 47 to electrically insulate them from each other. An end cap 50 for protection is fitted at an end of the self-powered neutron detector 46. A mineral-insulated cable 51 is connected to the other end of the self-powered neutron detector 46 and fixed at welds 52.

The mineral-insulated cable 51 includes a conductor 53 formed from copper or stainless steel, a metal sheath 54 covering the conductor 53, and a mineral insulator 55 such as alumina or magnesia, disposed between the conductor 53 and the metal sheath 54 to electrically insulate them from each other. The conductor 53 is electrically connected to the emitter 47, and the metal sheath 54 to the collector 48.

In the self-powered neutron detector 46, the emitter 47 is comprised of either a substance that generates beta radiation, or a substance that generates Compton electrons or photoelectrons after generating gamma radiation, upon the occurrence of a nuclear reaction with entry of a neutron. For this reason, a current that corresponds to the entry of the neutron occurs without a power supply. A current is detected to measure a neutron flux (intensity of radiation).

Next, operation of the embodiment of the neutron monitoring system according to the present invention is described below using FIGS. 1, 6, and 7.

Figure 6:
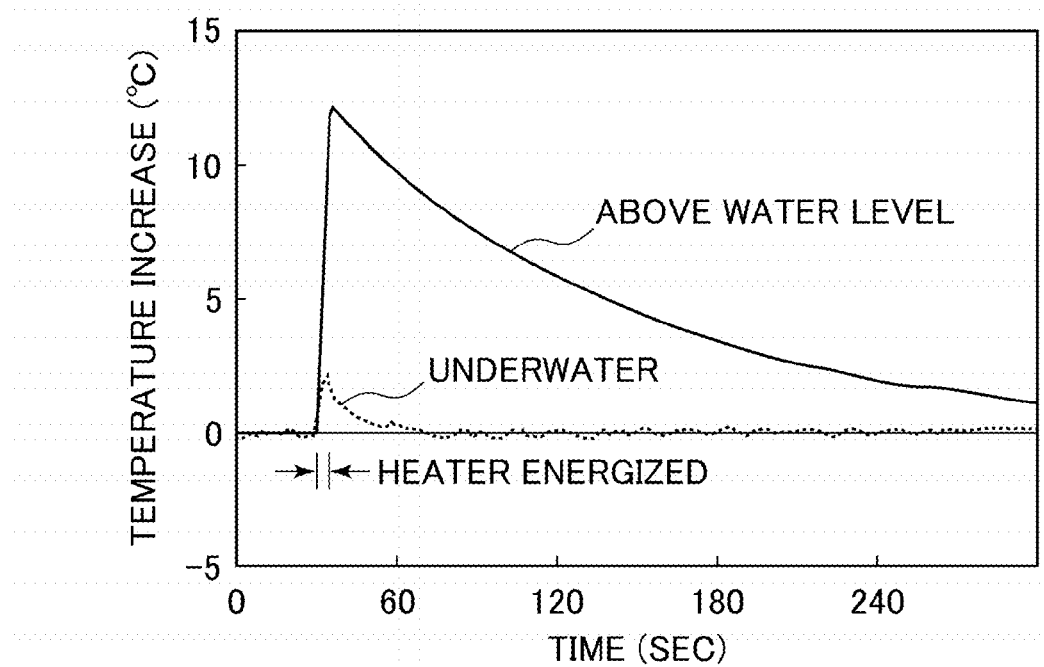
FIG. 6 is a characteristics diagram showing an example of a thermocouple output response in the embodiment of the neutron monitoring system according to the present invention.
Figure 7:
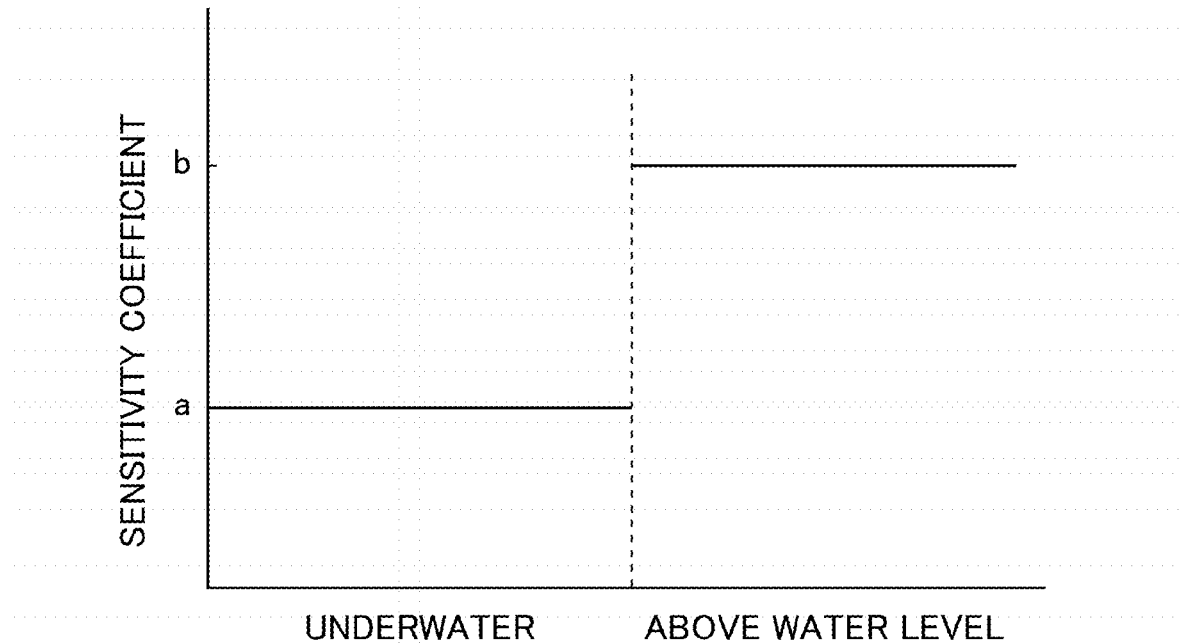
FIG. 7 is a conceptual diagram showing an example of setting sensitivity for correction in the embodiment of the neutron monitoring system according to the present invention.

FIG. 6 is a characteristics diagram showing an example of a thermocouple output response in the embodiment of the neutron monitoring system according to the present invention, and FIG. 7 is a conceptual diagram showing an example of setting sensitivity for correction in the embodiment of the neutron monitoring system according to the present invention.

First referring back to FIG. 1, a command signal is output from the water existence determining control section 23 to the heater control device 22 and the temperature measuring device 21, to sense whether each of the neutron detectors 9a-9e monitoring the position and output power of the fuel 27 inside and outside the reactor pressure vessel 1 is fully immersed in the coolant water or exposed above the water level. Thus a current is applied for a predetermined time from the heater control device 22 to the heater leads 33a-33e, 34a-34e (see FIG. 2) of the water detection sensors 11a-11e placed at positions corresponding to the same heights as are the neutron detectors 9a-9e. When current flows into the heating elements 32a-32e via the heater leads 33a-33e, 34a-34e, temperatures of the thermocouples 31a-31e increase since the thermocouples 31a-31e are arranged in close proximity to the heating elements 32a-32e. Thus, output voltages of the thermocouples 31a-31e increase.

Under the command from the water existence determining control section 23, the temperature measuring device 21 converts into temperature data a voltage that the thermocouples 31a-31e each output before the heater is electrically energized, and a voltage that the thermocouples 31a-31e each output while the heater is electrically energized. Then the temperature measuring device 21 transmits converted results to the water existence determining control device 23.

The water existence determining control device 23 calculates the increases in the temperatures of the thermocouples after a predetermined time of energizing on the basis of the temperature data obtained before and during the energizing of the heater. The water existence determining control device 23 then determines whether the water detection sensors 11a-11e are fully immersed in the coolant water or exposed above the water level.

In the example of a thermocouple output response that is shown in FIG. 6, the response depends upon whether each water detection sensor 11a-11e is fully immersed in the coolant water or exposed above the water level. This example shows an increase in the temperature of the corresponding thermocouple, developed when current is supplied to one heating element 32a for five seconds.

When the water detection sensor 11a-11e is fully immersed in the coolant water, the temperature increases by about 2° C. after five seconds from a start of energizing, and after energizing, decreases to a before-energizing temperature in about 20 seconds. On the contrary, when the water detection sensor 11a-11e is exposed above the water level, since the atmosphere whose heat transfer coefficient is small relative to that of water covers the water detection sensor 11a, energizing increases the temperature to about 12° C. Additionally a longer time is needed for an after-energizing temperature to decrease.

The increase in the temperature, and response characteristics of heating/cooling, however, depend upon a design of the sensor and a magnitude of the current supplied, and the response characteristics in FIG. 6 are only shown by way of example.

As described above, in the water existence determining control device 23 that has calculated the increase in the temperature, for example if a value of 5° C. is set as a determination criterion (threshold value) with respect to the temperature increase developed after the five seconds of energizing, then it can be determined whether the water detection sensor 11a-11e is fully immersed in the coolant water or exposed above the water level. Because the temperature increase depends upon parameters such as temperatures and pressures of the coolant water and the atmosphere, the determination criterion with respect to the increase in the temperature of the thermocouple is taken as a function of temperature and pressure, and stored into a threshold-data table of the storage device 23a.

The water existence determining control device 23 acquires the temperature data obtained before the energizing of the heater, pressure data from a pressure gauge not shown, and other data, then reads the temperature/pressure-dependent determination criterion from the threshold-data table of the storage device 23a, and compares the determination criterion with the temperature increase. The water existence determining control device 23 thus determines whether water exists on the water detection sensor 11a-11e (i.e., the water detection sensor is fully immersed in the coolant water) or the sensor is exposed above the water level. This determination result is transmitted to the correction circuit 24.

The amplification circuit 20 amplifies a neutron detection signal sent from the relevant neutron detector 9a-9e, and then outputs the amplified signal to the correction circuit 24. As described above, the water existence determination result by the water detection sensor 11a-11e, placed at positions corresponding to the same heights as are the neutron detector 9a-9e, is also input to the correction circuit 24.

On the basis of the water existence determination result, the correction circuit 24 sets a sensitivity coefficient by which the amplified neutron detection signal is to be multiplied, and then outputs to the measured-data conversion device 25 the neutron detection signal that has been multiplied by the set sensitivity coefficient.

FIG. 7 shows an example of setting sensitivity for correction. In this example, the sensitivity coefficient to be used when the water detection sensor is fully immersed in the coolant water is set to be "a", or the sensitivity coefficient to be used when the sensor is exposed above the water level is set to be "b", where "a" is smaller than "b".

For example, when the fission chamber 37 shown in FIG. 4 is fully immersed in the coolant water, a moderation effect against the neutron is significant. Thus, sensitivity of the fission chamber 37 becomes increased compared with that obtained when the chamber is exposed above the water level. Accordingly, when the water detection sensor, disposed at a position corresponding to the same height as is the fission chamber 37, is fully immersed in the coolant water, the neutron detection signal can be corrected by setting the sensitivity coefficient to be "a", the smaller value. Conversely when the water detection sensor is exposed above the water level, the neutron detection signal can be corrected by setting the sensitivity coefficient to be "b", the larger value.

The neutron detection signal that the correction circuit 24 has thus multiplied by the set sensitivity coefficient, depending upon whether an enough amount of coolant water exists, is converted into a neutron count rate (counts/s) or a neutron flux (n/cm2/s) by the measured-data conversion device 25.

In the above embodiment of the neutron monitoring system according to the present invention, whether the individual neutron detectors are fully immersed in the coolant water or exposed above the water level can be sensed, so that the data measurements by the neutron detectors can be corrected accurately from the sensing results. This in turn enables accurate detection of neutrons, thus contributing to estimating power and the fuel position more accurately even in case of such a severe accident that causes the fuel to melt.

It is to be noted that the present invention is not limited to the aforementioned embodiments, but covers various modifications. While, for illustrative purposes, those embodiments have been described specifically, the present invention is not necessarily limited to the specific forms disclosed. Thus, partial replacement is possible between the components of a certain embodiment and the components of another. Likewise, certain components can be added to or removed from the embodiments disclosed.

Note also that some or all of the aforementioned components, functions, processors, and the like can be implemented by hardware such as an integrated circuit or the like. Alternatively, those components, functions, and the like can be implemented by software as well. In the latter case, a processor can interpret and execute the programs designed to serve those functions.

Further note that the control lines and information lines shown above represent only those lines necessary to illustrate the present invention, not necessarily representing all the lines required in terms of products.

What is claimed is:
1. A neutron monitoring system for monitoring a state of fuel in a nuclear power plant, the system comprising:
 a neutron detector;
 a structural member to which the neutron detector is mounted;
 a water detection sensor mounted at a position corresponding to the same height as is the neutron detector, the water detection sensor including a thermocouple and a heating element;
 a heater power supply connected to the heating element via heater lead wires;
  wherein the heating element is positioned to heat the thermocouple;
 a temperature measuring circuit connected to the thermocouple via strands;
 a water existence determining control section,
  wherein the water existence determining control section is configured to receive temperature data from the temperature measuring circuit, wherein the water existence determining control section is configured to determine, responsive to receiving the temperature data, whether the water detection sensor is underwater, wherein the water existing determining control section is configured to output a determination signal that is indicative of whether the water detection sensor is underwater;

an amplification circuit, wherein the amplification circuit is configured to amplify a neutron detection signal sent from the neutron detector, wherein the amplification circuit is configured to output a signal value that corresponds to the amplified neutron detection signal; and a correction circuit, wherein the correction circuit is configured to receive the signal value, wherein the correction circuit is configured to receive the determination signal, wherein the correction circuit is configured to correct the signal value in accordance with the determination signal.

2. A neutron monitoring system for monitoring a state of a fuel in a nuclear power plant, the system comprising:

at least one in-core instrumentation tube inserted in a reactor core;

a neutron detector housed in the in-core instrumentation tube;

a water detection sensor mounted at a position corresponding to the same height as is the neutron detector, the water detection sensor including a thermocouple and a heating element;

a heater power supply connected to the heating element via heater lead wires;

wherein the heating element is positioned to heat the thermocouple;

a temperature measuring circuit connected to the thermocouple via strands;

a water existence determining control section, wherein the water existence determining control section is configured to receive temperature data from the temperature measuring circuit, wherein the water existence determining control section is configured to determine, responsive to receiving the temperature data, whether the water detection sensor is underwater, wherein the water existing determining control section is configured to output a determination signal that is indicative of whether the water detection sensor is underwater;

an amplification circuit, wherein the amplification circuit is configured to amplify a neutron detection signal sent from the neutron detector, wherein the amplification circuit is configured to output a signal value that corresponds to the amplified neutron detection signal; and a correction circuit, wherein the correction circuit is configured to receive the signal value, wherein the correction circuit is configured to receive the determination signal, wherein the correction circuit is configured to correct the signal value in accordance with the determination signal.

3. A neutron monitoring system for monitoring a state of a fuel in a nuclear power plant, the system comprising:

a neutron detector mounted on a support member placed inside a pedestal located below a reactor pressure vessel;

a water detection sensor mounted at a position corresponding to the same height as is the neutron detector, the water detection sensor including a thermocouple and a heating element;

a heater power supply connected to the heating element via heater lead wires;

wherein the heating element is positioned to heat the thermocouple;

a temperature measuring circuit connected to the thermocouple via strands;

a water existence determining control section, wherein the water existence determining control section is configured to receive temperature data from the temperature measuring circuit, wherein the water existence determining control section is configured to determine, responsive to receiving the temperature data, whether the water detection sensor is underwater, wherein the water existing determining control section is configured to output a determination signal that is indicative of whether the water detection sensor is underwater;

an amplification circuit, wherein the amplification circuit is configured to amplify a neutron detection signal sent from the neutron detector, wherein the amplification circuit is configured to output a signal value that corresponds to the amplified neutron detection signal; and a correction circuit, wherein the correction circuit is configured to receive the signal value, wherein the correction circuit is configured to receive the determination signal, wherein the correction circuit is configured to correct the signal value in accordance with the determination signal.

4. The neutron monitoring system according to claim 1, wherein the neutron detector is a fission chamber.

5. The neutron monitoring system according to claim 1, wherein the neutron detector is a self-powered neutron detector.

* * * * *